United States Patent [19]
Johansen et al.

[11] Patent Number: 5,812,357
[45] Date of Patent: Sep. 22, 1998

[54] ELECTROSTATIC DISCHARGE PROTECTION DEVICE

[75] Inventors: Arnold W. Johansen, Marlboro; David V. Cronin, Peabody, both of Mass.

[73] Assignee: Polaroid Corporation, Cambridge, Mass.

[21] Appl. No.: 729,142

[22] Filed: Oct. 11, 1996

[51] Int. Cl.$^6$ .................................................. H01G 47/00
[52] U.S. Cl. ........................ 361/212; 361/220; 361/221
[58] Field of Search .................... 361/212, 220, 361/221, 222, 91; 324/207.21; 360/113, 104, 128

[56] References Cited

U.S. PATENT DOCUMENTS

| | | | |
|---|---|---|---|
| 3,467,940 | 9/1969 | Wallo | 339/14 |
| 3,653,498 | 4/1972 | Kisor | 206/46 H |
| 3,774,075 | 11/1973 | Medesha | 317/2 R |
| 3,869,191 | 3/1975 | Tolnar, Jr. et al. | 339/111 |
| 4,019,094 | 4/1977 | Dinger et al. | 361/220 |
| 4,179,178 | 12/1979 | Bachman et al. | 339/111 |
| 4,369,707 | 1/1983 | Budde | 102/202.2 |
| 4,531,176 | 7/1985 | Beecher, II | 361/212 |
| 4,617,605 | 10/1986 | Obrecht et al. | 361/220 |
| 4,780,604 | 10/1988 | Hasegawa et al. | 361/220 |
| 4,841,408 | 6/1989 | Matsunaga et al. | 361/220 |
| 4,971,568 | 11/1990 | Cronin | 439/188 |
| 5,108,299 | 4/1992 | Cronin | 439/188 |
| 5,163,850 | 11/1992 | Cronin | 439/507 |
| 5,164,880 | 11/1992 | Cronin | 361/220 |
| 5,259,777 | 11/1993 | Schuder et al. | 439/188 |
| 5,289,336 | 2/1994 | Gagliano | 361/220 |
| 5,465,186 | 11/1995 | Bajorek et al. | 360/113 |
| 5,490,033 | 2/1996 | Cronin | 361/212 |
| 5,491,605 | 2/1996 | Hughbanks et al. | 360/113 |
| 5,562,489 | 10/1996 | Cronin | 439/507 |
| 5,583,733 | 12/1996 | Cronin | 361/111 |
| 5,599,205 | 2/1997 | Cronin | 439/507 |
| 5,633,780 | 11/1997 | Cronin | 361/220 |

FOREIGN PATENT DOCUMENTS

| | | |
|---|---|---|
| 2348630 | 3/1975 | Germany . |
| 59-13353 | 1/1984 | Japan . |
| 61-148852 | 11/1986 | Japan . |
| 62-276855 | 1/1987 | Japan . |

OTHER PUBLICATIONS

U.S. Patent Application Serial No. 08/454,963, David V. Cronin, filed May 31, 1995.
U.S. Patent Application Serial No. 08/577,919, David V. Cronin and Arnold W. Johansen, filed Dec. 21, 1995.
U.S. Patent Application Serial No. 08/577,920, Arnold W. Johansen, filed Dec. 21, 1995.
U.S. Patent Application Serial No. 08/664,147, David V. Cronin, filed Jun. 14, 1996.
U.S. Patent Application Serial No. 08/834,449, David V. Cronin and Arnold W. Johansen, filed Apr. 16, 1997.
Middlebrook, Carlton G., "Electrical Shorting Cap," *Navy Technical Disclosure Bulletin*, vol. 6, No. 3, Mar. 1981, pp. 33–36 (Navy Technology Catalog No. 5260 1530, Navy Case No. 63818).
Wang, Shay–Ping T., and Ogden, Paul, "Membrane–Type Pin Protector for Pin Grid Array Devices," 1991 IEEE/SEMI Advanced Semiconductor Manufacturing Conference, pp. 120–127.

*Primary Examiner*—Jeffrey A. Gaffin
*Assistant Examiner*—Michael J. Sherry
*Attorney, Agent, or Firm*—Wolfgang E. Stutius; Christopher P. Ricci

[57] ABSTRACT

An electrostatic discharge protection device is provided for use with a magnetic read/write transducer. The electrostatic discharge protection device electrically interconnects the conductive elements of magnetoresistive (MR) and inductive heads to provide a low-resistance conductive path placing the conductive elements at a substantially equal electrical potential, thus minimizing electrostatic discharge. The electrostatic discharge protection device provides an electrical path between the conductive elements which is manually or automatically removable upon connection to a mating element. The electrostatic protection device has a resilient inward bias to connect electrically conductive elements such that a ground is established between them and is removed automatically upon insertion of the conductive elements into a mating receptacle which is interposed between the conductive elements and the electrostatic discharge protection device.

38 Claims, 13 Drawing Sheets

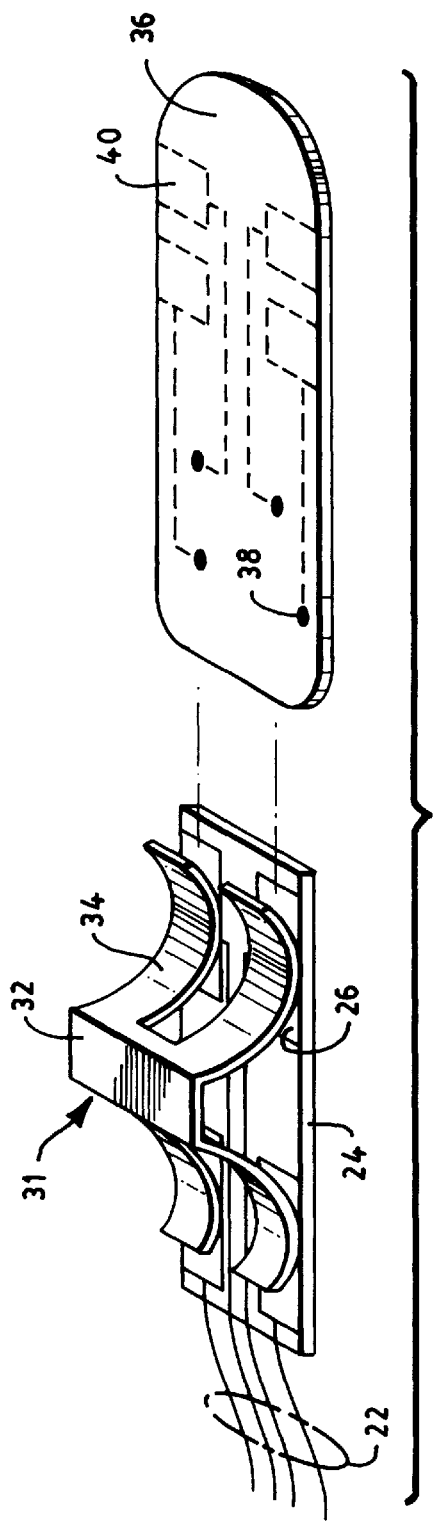
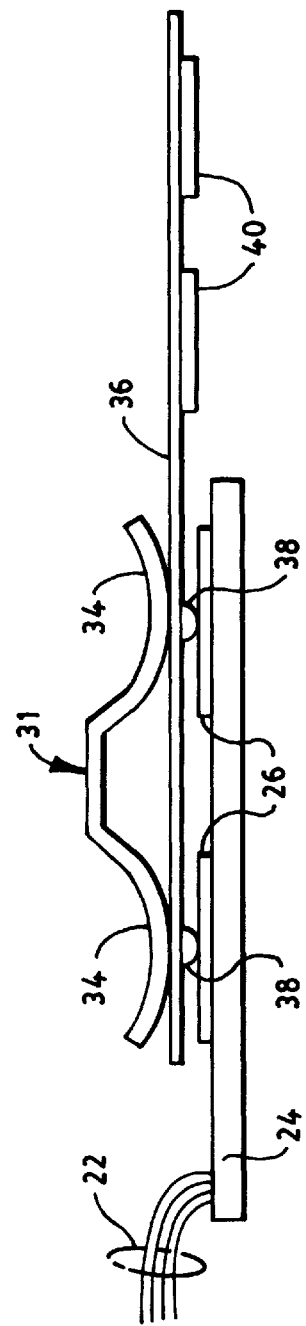

ELECTROSTATIC DISCHARGE PROTECTION DEVICE

BACKGROUND OF THE INVENTION

The present invention relates generally to an electrostatic discharge protection devices. More particularly, the invention relates to electrostatic discharge protection devices for protecting magnetic disk drives, and more specifically a read/write transducer utilizing magnetoresistive read sensors against electrostatic discharge or electrical overstress during manufacturing and processing.

Magnetic head disk drive systems have been widely accepted in the computer industry as a cost-effective form of data storage. In a magnetic disk drive system, a magnetic recording medium in the form of a disk, rotates at high speed while a magnetic read/write transducer referred to as a magnetic head, "flies" slightly above the surface of the rotating disk. The magnetic disk is rotated by means of a spindle drive motor. The magnetic head is attached to or formed integrally with a flexure which is suspended over the disk on a spring loaded support arm, known as a gimbal. As the magnetic disk rotates at operating speed, the moving air generated by the rotating disk in conjunction with the physical design of the flexure operates to lift the magnetic head allowing it to glide, or "fly", slightly above the disk surface on a cushion of air, commonly referred to as an air bearing. The flying height of the magnetic head over the disk surface is typically only a few micrometers or less and is primarily a function of disk rotation, the aerodynamic properties of the flexure assembly, and the force exerted by the spring loaded gimbal.

A major problem encountered during manufacture, handling and use of magnetic recording transducers, known as heads, is the build-up of electrostatic charges on the various elements of a head or other objects which come into contact with the heads, particularly heads of thin film type, and accompanying spurious discharge of the static electricity thus generated. Static electricity, or electrostatic charge, is a stationary electric charge which accumulates on various surfaces. An electrostatic discharge ("ESD") occurs when the electrostatic charge becomes substantial enough to overcome a dielectric material between the charge and another surface of lower electrical potential. An example of such a discharge is naturally occurring lightning. Electrostatic discharge in the realm of electronics, can be devastating to microelectronics devices. A sharp voltage spike caused by an electrostatic discharge can cause permanent and costly damage to individual to precision devices such as the aforementioned read head.

Static charges may be produced by the presence of certain materials such as plastics during manufacture and subsequent handling of heads, for example. These charges arc across the edge of the insulating layer between the magnetic pole tips and adjacent conductive layers, which are exposed and positioned adjacent to the transducing gap at the flexure air-bearing surface facing the recording medium. This discharge causes erosion of the pole tips and degradation of the transducer in reading and writing of data at minimum or may destroy the head in its entirety.

Several solutions have been proposed to solve the problem of electrostatic discharge. Bajorek et al., U.S. Pat. No. 5,465,186 discloses an inductive head having short discharge paths formed by the deposition of conductive material in recesses formed in an insulating layer so that the electrostatic discharge will occur in areas displaced from the critical pole tip and gap area displaced from the critical pole tip and gap area of the slider air bearing surface. Schwartz et al, U.S. Pat. No. 4,800,454 discloses an inductive head assembly wherein the magnetic pole piece in the inductive coil winding are coupled to the slider to allow discharge of any static electric charges which may build up. The winding is connected to the slider body via a diode in high forward and reverse voltage drops or through a fusible link.

Magneto resistive ("MR") sensors are well known and are particularly useful as read elements in magnetic transducers especially at high data recording densities. The MR head sensor provides a higher output signal than an inductive read head. This higher output signal results in a higher signal to noise ratio for the recording channel and thus, allows higher area densities of recorded data on a magnetic disk surface to be achieved. As described above, when a MR sensor is exposed to ESD or even a voltage or current input larger than that intended under normal operating conditions referred to as electrical over stress or EOS, MR read sensor and other pans of the head may be damaged. This sensitivity to electrical damage is particularly severe for MR read sensors because these sensors are relatively small physical size. For example, an MR sensor used for extremely high recording densities will have a cross section of 100 angstroms by 1 micrometer or smaller. Discharge of voltages of only a few volts through such a physically small resistor is sufficient to produce currents capable of severely damaging or completely destroying the MR sensor. The nature of the damage which may be experienced by a MR sensor varies significantly including complete destruction of the sensor via melting and evaporation contamination of the air-bearing surface generation of shorts via electrical breakdown and milder forms of damage in which the head performance may be degraded. This type of damage to the MR head has been found to occur during both processing and use and poses a serious problem for manufacturing and handling of magnetic heads incorporating MR read sensors.

An electrical short provided across the wires of the MR sensor element has been found to be effective in raising the failure voltage and minimizing or eliminating damage to the MR head due to ESD. The shorted wires shunt the majority of discharge current around the MR sensor element. U.S. Pat. No. 5,465,186 disclosing shorting the MR sensor element wires at the sensor input pads. However, during application, removal of the short circuit together with is the process changes required to provide wires and associated connection pads for other head elements such as the magnetic shields and substrate can make this approach difficult and expensive to implement. Thus, an electrostatic discharge protection device which provides electrical shorting of the head elements in which does not require extensive process changes, allows easy removal of short prior to the head being integrated and assembled in the magnetic disk storage device is needed.

Commonly assigned patents and co-pending applications that provide electrostatic discharge protection devices for various semiconductor packages include U.S. Pat. No. 5,108,299 entitled "Electrostatic Discharge Protection Devices for Semiconductor Chip Packages" by David V. Cronin issued Apr. 28, 1992, U.S. Pat. No. 4,971,568 entitled "Electrical Connector with Attachment for Automatically Shorting Select Conductors Upon Disconnection of Connector" by David V. Cronin issued Sep. 20, 1990, U.S. Pat. No. 5,163,850 entitled "Electrostatic Discharge Protection Devices For Semiconductor Chip Packages" by David V. Cronin issued Nov. 17, 1992, U.S. Pat. No. 5,164,880 entitled "Electrostatic Discharge Protection Device for Printed Circuit Board" by David V. Cronin issued Nov. 17, 1992, U.S. Pat. No. 5,490,033 entitled "Electrostatic Discharge Protection Device" by David V. Cronin issued Feb. 6, 1996, and U.S. Pat. No. 5,562,489 issued Oct. 8, 1996 and U.S. Pat. No. 5,599,205 issued Feb. 4, 1997, each entitled "Electrostatic Discharge Protection Device" by David V. Cronin.

Accordingly, it is an object of this invention to minimize damage to MR sensors caused by discharge of static electricity through electrical overstress of the MR sensor and other transducer components.

It is another object of this invention to provide an MR sensor wherein the MR head elements are electrically shorted together to provide EOS and ESD protection by shunting excessive current away from the MR element and other critical head components.

It is a further element of this invention to provide an electrostatic discharge protection device that automatically withdraws when coupled to either a testing device or a printed circuit board.

These and other objects of the invention will be obvious and will appear hereinafter.

SUMMARY

The aforementioned and other objects are achieved by the invention which provides an electrostatic discharge protection device for protecting semiconductor chip packages, particularly MR heads, and a method associated therewith. The electrostatic discharge protection device is generally used with a semiconductor chip package having a conductor that connects the semiconductor chip package to a printed circuit board. The conductor, in turn, has a plurality of spaced-apart conductive pads at its terminus for electrically communicating with the printed circuit board.

The plurality of spaced-apart conductive pads have a surface adapted to receive an electrical connector. The electrostatic discharge protection device then selectively inhibits electrostatic charge accumulation by electrically connecting the spaced-apart conductive pads thus ensuring a common electrical potential at each of the spaced-apart conductive pads. The electrostatic discharge protection device comprises a base member having a plurality of legs extending therefrom and an actuation means.

The base member is generally fabricated from a conductive material which is fixedly disposed with respect to the pads. The base member provides a conductive path between the legs. Optionally, this can be fabricated from a non-conductive material with a conductive coating or paint linking the legs.

The plurality of legs have an inherent resilient bias and are integrally connected to the base member and extend outward therefrom. Normally, the legs are bias into electrical contact with the spaced-apart conductive pads so as to form a short circuit therebetween. The legs are selectively movable out of electrical contact with the spaced-apart conductive pads by the actuation means. In this way, the legs are reversibly movable between an operative, shorting position and an inoperative, open position thus selectively inhibiting electrostatic charge accumulation.

The operative position is attained when the inherent resilient bias of the plurality of legs locks each of the plurality of legs against a surface of a respective one or more of the plurality of spaced-apart conductive pads. The one or more of the plurality of spaced-apart conductive pads in electrical communication with the base member thus inhibits electrostatic charge accumulation on the plurality of spaced-apart conductive pads.

The inoperative position is attained when the inherent resilient bias of the plurality of legs is overcome, thus disrupting the electrical communication with the plurality of spaced-apart conductive pads. By disrupting this electrical communication the spaced-apart conductive pads become electrically isolated from the base member thereby allowing independent electrical communication along the conductor.

In further, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 2 shows a perspective view of a portion of the electrostatic discharge protection device according to the invention of FIG. 1;

FIG. 3 shows a side view of the electrostatic discharge protection device as shown in FIG. 1;

DETAILED DESCRIPTION

While the present invention retains utility within a wide variety of circuit board and conductor configurations and may be embodied in several different forms, it is advantageously employed in connection with a magnetic disk storage system having a magnetoresistive ("MR") read head. Though this is the form of the preferred embodiment will be described as such, this embodiment should be considered illustrative and not restrictive. One skilled in the art will realize that the MR head discussed herein is a semiconductor chip package and that other electronic devices, semiconductor or otherwise, will benefit from the invention.

Figure 1:
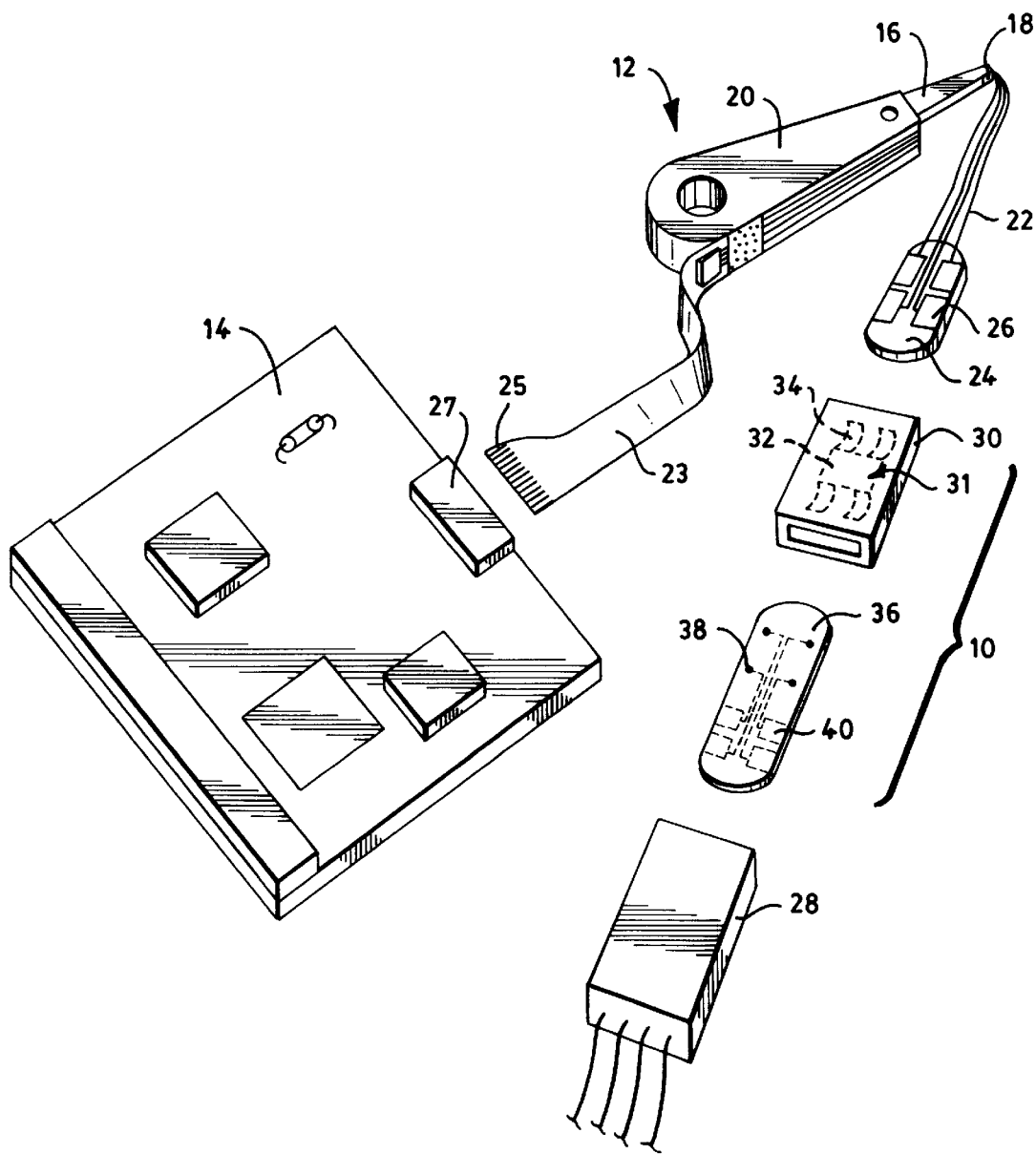
FIG. 1 shows a perspective view of an electrostatic discharge protection device for use with a MR head.

Referring now to FIG. 1, an electrostatic discharge protection device 10 is shown with a read/write structure 12 which is generally disposed within a magnetic disk storage device (not shown). The read/write structure 12, in turn, is electrically connected to a printed circuit board 14.

The read/write structure 12 is comprised of a series of flexures 16, each having MR head 18 disposed at its terminus. The flexures 16 are secured to a gimbal 20 which hold the flexures securely relative within the magnetic disk storage device (no shown).

During the manufacturing process each flexure 16 has the MR head 18 attached thereto. The MR head 18 has a series of wires 22 extending therefrom. Once the MR head 18 is attached to the flexure 16 and the flexure 16 is attached to the gimbal 20 the MR head 18 must be tested to insure proper operation. For this reason, the wires 22 are connected to a paddle board 24 having a series of pads 26 associated with each of the wires 22. Paddle board in practice can then be placed within a test device 28 which can run a series of tests on the MR head 18 and thus ensure proper operation. Later in the manufacturing process, the wires 22 are soldered to a conductor 23 having conductive pads 25 at its terminus. The conductive pads 25 are fabricated to mate with a mating connector 27 on the printed circuit board 14.

Each of the aforementioned steps in the manufacturing process, however, exposes the MR head 18 to electrostatic charge accumulation which can damage or destroy the MR head 18. The electrostatic discharge protection device 10 of the invention is used to alleviate the problem.

The electrostatic discharge protection device 10 comprises a housing 30 with a conductive element 31 disposed therein. The conductive element 31 is usually fabricated from a conductive material, though a non-conductive material coated with a conductor would also work. In the preferred embodiment, the material is a berrylium copper which is both conductive and has an inherent resilient bias such that the force incurred by the element 31 is absorbed and the conductive element 31 still retains its shape.

The conductive element 31 has a base 32 which is fixedly secured to the housing 30. Extending from the base 32 are legs 34 having a substantially parallel spaced-apart relationship to one another such that the legs 34 correspond to each of the pads 26 on the paddle board 24. The legs 34 extend from the base with a substantially arcuate shape to provide ease of placement and removal of the paddle board 24 under the legs 34. The paddle board 24 is inserted into the housing 30 under the conductive element 31 and the legs 34 each form an electrical contact with the pads 26. Since the conductive element 31 is electrically conductive, each of the pads 26 are then kept at a substantially equal electrical potential, thus grounding any electrostatic charge and inhibiting charge accumulation that could be destructive to the MR head 18.

Referring now to FIGS. 2 and 3 with continuing reference to FIG. 1, a test device 28 can be used to test the MR head 18 by adapting the test device 28 such that it operates with the electrostatic discharge protection device 10. In the preferred embodiment, this is accomplished by inserting a slider 36 into the housing 30. The slider 36 slides between the legs 34 and the paddle board 24 to adapt the electrostatic discharge protection device 10 for use with a specific test device 28. The top surface of the slider 36 is electrically non-conductive, or insulative, thus inhibiting any charge conduction by the conductive element 31. On an underside of the slider 36, contacts 38 corresponding to each of the pads 26 are located.

To test the MR head 18, the slider 36 is moved into the housing 30 with the top surface toward the conductive element 31 placing the conductive element 31 into an inoperative position. The contacts 38 now are electrically communicative with each of the pads 26 while physically extending out from the housing 30. The slider 36 has extension pads 40 disposed similarly to that of the pads 26 on the paddle board 24. Thus, the test device 28 can be used with the electrostatic discharge protection device 10 with no additional adaptation required.

Figure 4A:
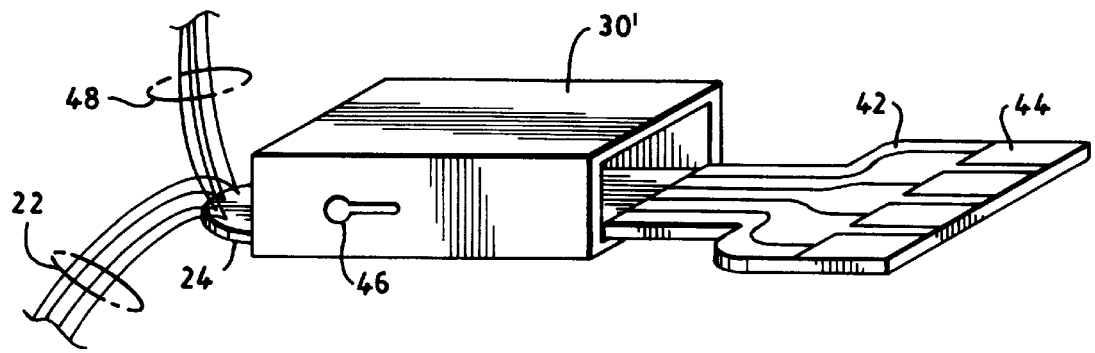
FIGS. 4A and 4B show alternative embodiments of the electrostatic discharge protection device of FIG. 3.
Figure 4B:
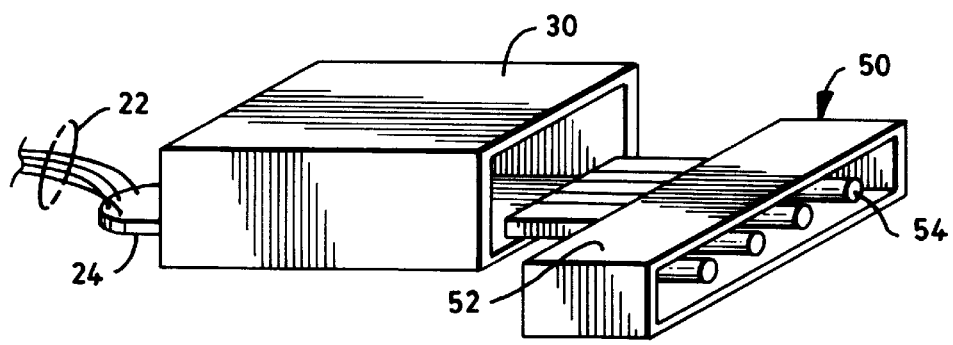

Referring now to FIGS. 4A and 4B where like numerals designate previously described elements, there is shown alternative embodiments of the electrostatic discharge protection device. In FIG. 4A, a housing 30' is shown having a handle 46 extending therefrom with leads 48 electrically connected to the wires 22. This particular embodiment of the housing 30' will be described in detail later herein.

In FIGS. 4A and 4B alternative sliders are shown that adapt the housing for use with different test equipment. In FIG. 4A the slider 42 has pads 44 disposed substantially parallel in space to part relationship to each other. In FIG. 4B a slider 50 is shown that has a housing 52 with pin connectors 54 extending from within a receptor housing. In practice, these embodiments act substantially similarly to that of the previously described embodiment where the wires 22 go into the paddle board 24 and into the housing 30 to make contact with the slider 42, 50 when placed into position.

Figure 5A:
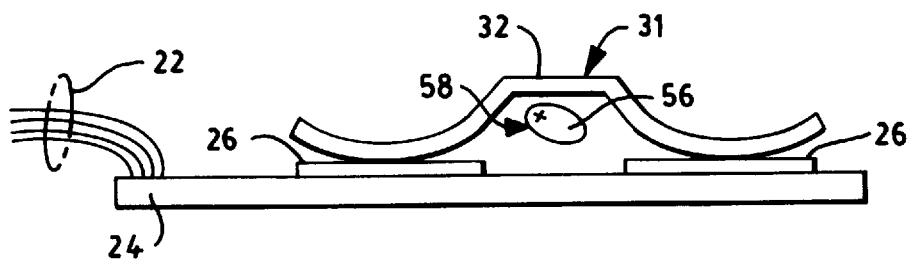
FIGS. 5A and 5B show a side view of the electrostatic discharge protection device of FIG. 4A.
Figure 5B:
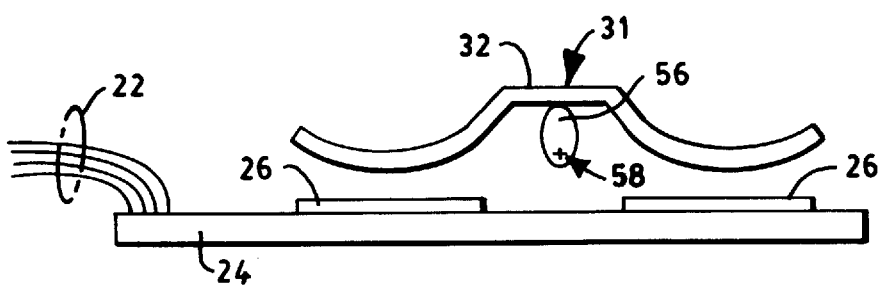

FIGS. 5A and 5B show an alternative actuation device for use with the electrostatic discharge protection device previously described. These particular elements work particularly with the embodiment of FIG. 4A having an having a housing 30' with an external handle 46 as a manual actuator. Handle 46 is connected to a cam 56 which is disposed under the base 32 of the conductive element 31. The cam 56 is normally disposed in a disengaged position allowing the conductive element 31 to make electrical contact with the pads 26 on the paddle board 24, thereby establishing an operative position for the conductive element 31.

To move the conductive element 31 into an operative position, the cam pivots about a pivot point 56 so as to force the base 32 of the conductive element 31 upwards away from the paddle board 24, thus disconnecting the electrical connection between the pads 26. This provides a manual method of connecting and disconnecting the electrostatic discharge protection device. A method of automating the disconnection without the use of a slider will be described hereinafter.

In an alternative embodiment, the electrostatic discharge protection device can be made to operate with test probes (not shown). Test probes are generally devices having a conductive tip that are placed in direct contact with an electrical contact to garner information therefrom. To provide this ability, the electrostatic discharge protection device is simply made to be axially shorter relative to the paddle board 24, thus allowing the pads 26 to extend outward from the housing 30'. In this way, the electrostatic discharge protection device can be moved into the inoperative position to allow individual testing by a test probe of each of the pads 26.

Figure 6:
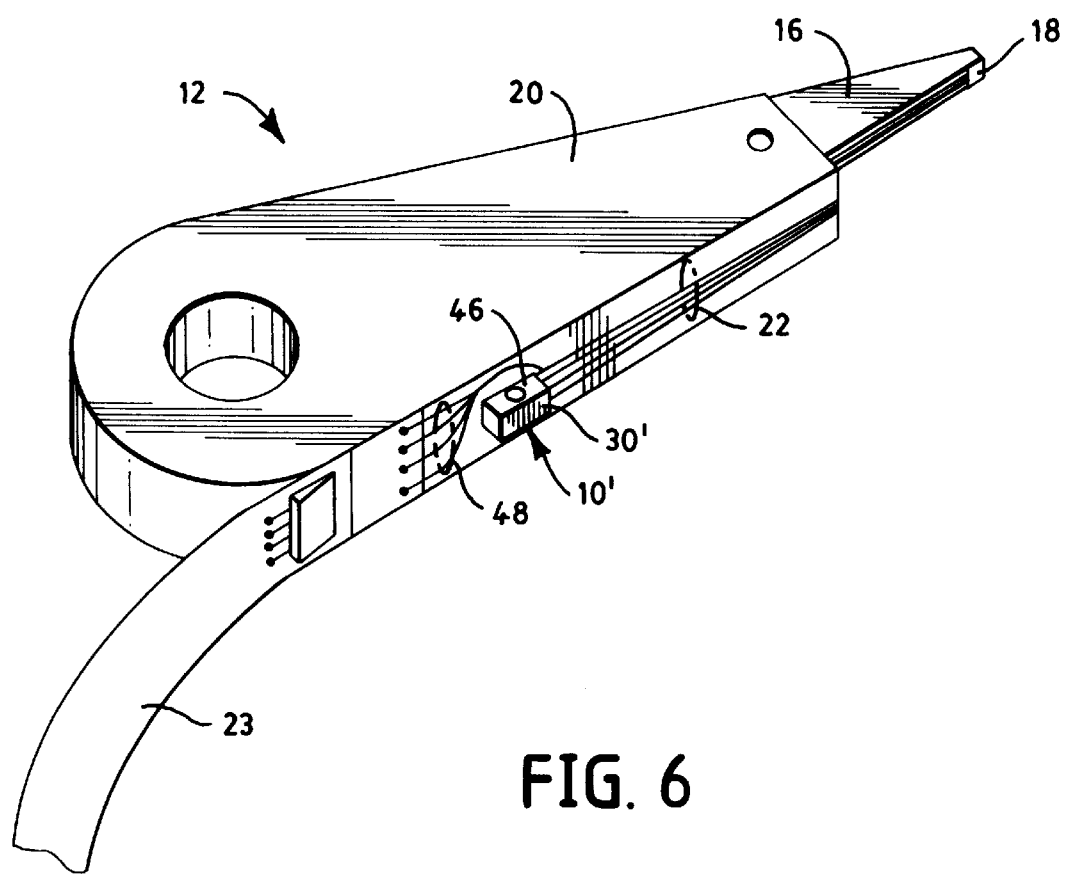
FIG. 6 shows an electrostatic discharge protection device secured to an MR head.

In practice, once the MR head 18 in FIG. 6 is tested and passes such tests the wires 22 must be electrically connected to the conductor 23 so that the MR head 18 can ultimately be connected with the circuit board 14 of FIG. 1. The previous practice had been to remove the paddle board and solder the wires 22 to the connector 23. This again presents an opportunity for electrostatic charge accumulation and damage to the MR head. Therefore, in this embodiment of the invention, the electrostatic discharge protection device 10' having the housing 30' with the handle 46 extending therefrom is permanently attached to a lateral surface of the gimbal 20 of the read/write structure 12. The leads 48 which extend from the housing 30' have a one to one relationship with the wires 22 are then soldered to the conductor 23. Once the electrical connections between the wires 22 and the conductor 23 is established, the handle 46 can be used as previously described to actuate the cam and remove the electrostatic discharge protection.

Figure 7:
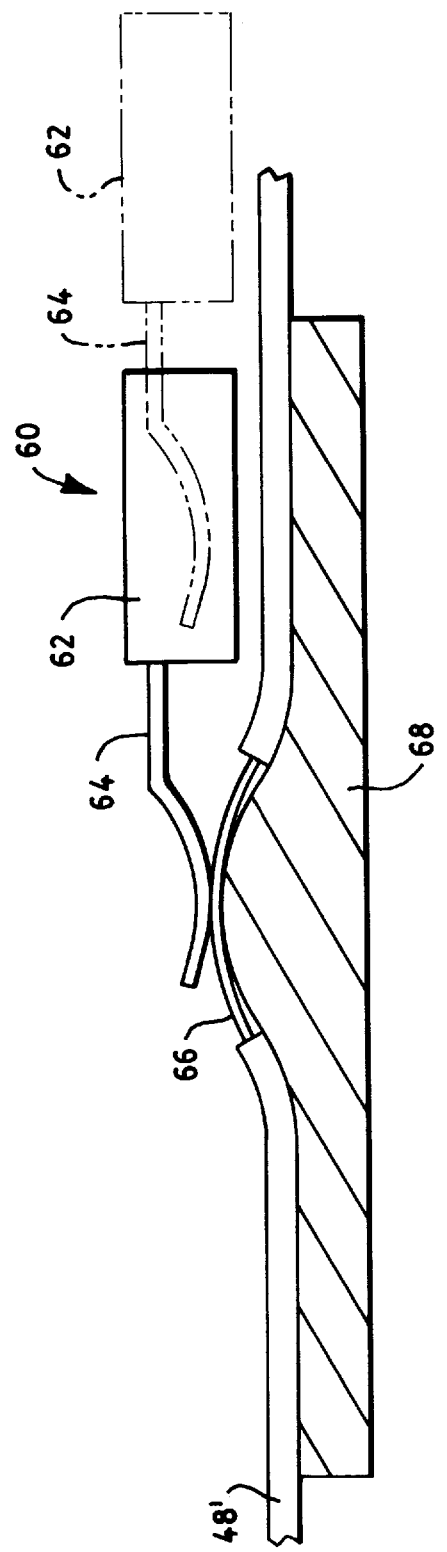
FIG. 7 shows an alternative embodiment of an electrostatic discharge protection device.
Figure 8A:
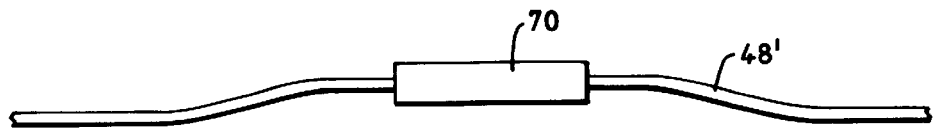
FIGS. 8A–8E show alternative embodiments of the electrostatic discharge protection device.
Figure 8B:
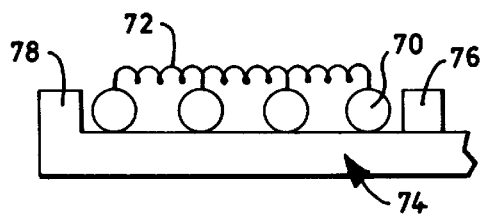
Figure 8C:
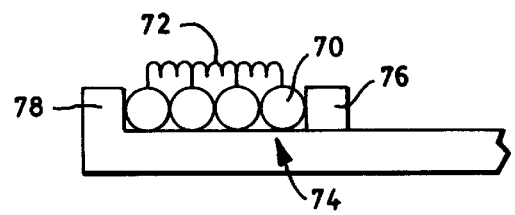
Figure 8D:
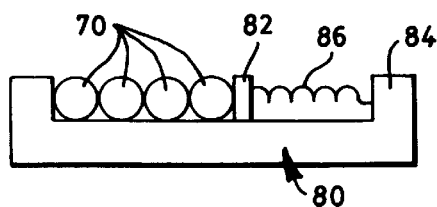
Figure 8E:
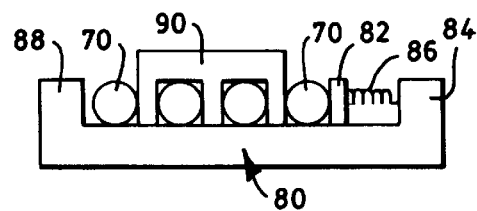

FIGS. 7–8E show alternative embodiments of the electrostatic discharge protection device 10' where a sliding-type actuator is shown which moves the electrostatic discharge protection devices between operative and inoperative positions.

In FIG. 7 a base 68 is provided where the leads 48' are disposed thereon. The leads 48' have a stripped section 66 where the insulative sheath of the leads 48' has been stripped, thus providing access to the internal conductor within the leads 48. A conductive element 60 has legs 64 extending from the base 62 to provide an electrical contact with the stripped section 66. The conductive element 60 is normally in an operative position such that the legs 64 are in contact with the stripped section 66 of the wire 48' so as to provide an electrical short circuit as previously described. To move the electrostatic discharge protection device to the inoperative position, the handle 46 is used to slide the conductive element 60 away from the stripped section 66. In the inoperative position, the legs 64 are no longer in contact with the stripped section 66 as is shown in phantom in the Figure.

FIG. 8A shows leads 48' having a stripped section (not shown) as previously described stripped of its insulative sheath. In this embodiment though, a conductive sheath 70 is placed over the stripped section so as to increase the diameter of the leads 48'. This is due to the fact that the leads 48' and the wires 22 are generally on the order of a 46 gauge wire which makes the leads 48' difficult for the following embodiments. The conductive sheath 70 then allows a section of increase diameter for manipulation.

FIGS. 8B and 8C show electrostatic discharge protection device 74 having a base 78 with an 'L' shape. The conductive sheaths 70 of the individual leads are placed in the electrostatic discharge protection device 74 with a spring 72 biasing them in a spaced-apart relationship. Base 78 is electrically insulative and, therefore, the position of the base 78 provides electrical isolation between the leads 48'. The handle 46 in this embodiment actuates a slide 76 which overcomes the bias of the springs 72 and pushes the conductive sheaths 70 into electrical contact with one another thus moving the electrostatic discharge protection device 74 into the operative position and electrically grounding the leads 48'.

FIGS. 8D and 8E show an alternative embodiment to that previously described where the base 84 has a substantially 'U'-shaped cross-section. The conductive sheaths 70 in this embodiment are disposed within the base 84 in a normally electrically connected position with a spring 86 biasing a slider 82 against them. To move the electrostatic discharge protection device 80 into the non-conductive, inoperative position, a comb 90 is pushed downward through the leads 48'. The comb pushes between the conductive sheaths 70 forcing electrical isolation between the conductive sheaths 70.

The comb 90 is generally made of an insulative material and is disposed in an actuable position relative to a housing (not shown) of the electrostatic discharge protection device 80.

Figure 9A:
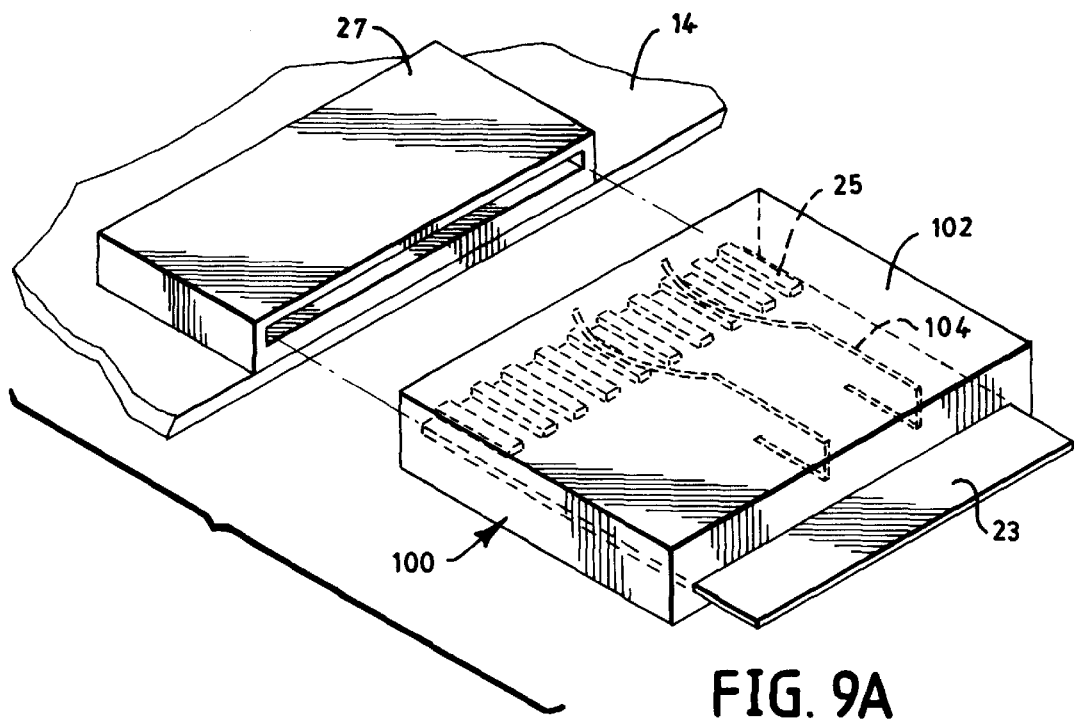
FIGS. 9A and 9B show an electrostatic discharge protection device used for grounding a cable associated with the MR head of FIG. 1.
Figure 9B:
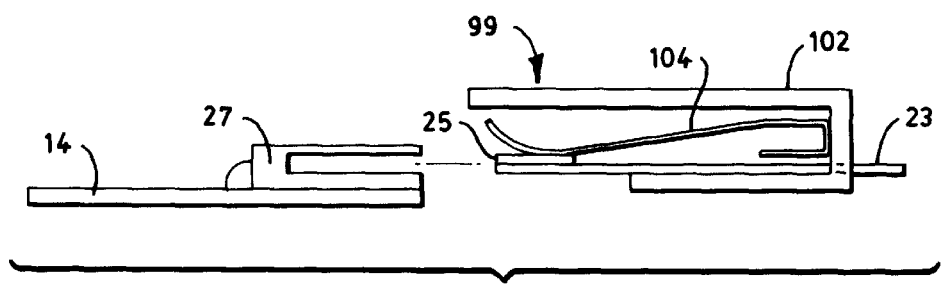

Once the leads 48, 48' are electrically connected to the conductor 23 and the various electrostatic discharge protection devices are moved into the inoperative position, the MR head 18 is again open to electrostatic charge damage. FIGS. 9A and 9B show an additional electrostatic discharge protection device 100 for grounding such electrostatic charge, thus protecting the MR head in this circumstance.

In this embodiment, the electrostatic discharge protection device 100 is disposed at the terminus of the conductor 23 over the conductive pads 25. The electrostatic discharge protection device 100 has a housing 99 which contains a conductive element 104. The conductive pads 25 of the conductor 23 are pushed into the mating connector 27 such that the connector is moved between the conductive element 104 and the conductive pads 25, thereby moving the electrostatic discharge protection device 100 into the inoperative position.

Figure 10:
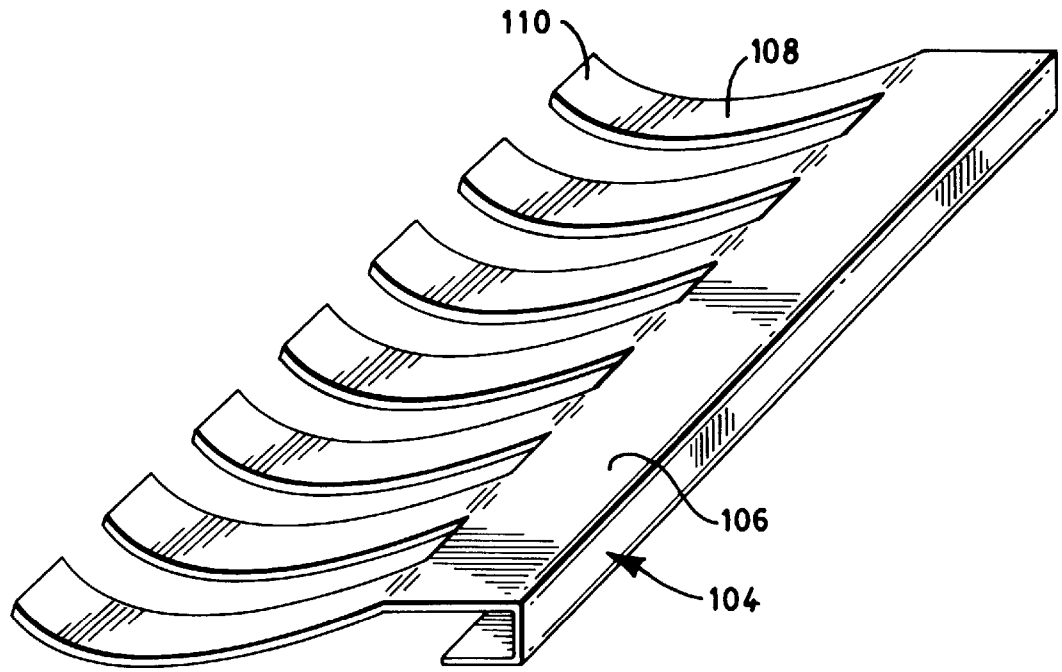
FIG. 10 shows the conductive element of the electrostatic discharge protection device of FIG. 9.

FIG. 10 shows in more detail the conductive element 104 where the conductive element 104 has a base 106 which is electrically conductive to connect the legs 108 to each other. The legs 108 are disposed in spaced apart relationship to one another and correspond to the conductive pads 25 on the conductor 23 thereby electrically connecting each of the conductive pads 25.

Figure 11:
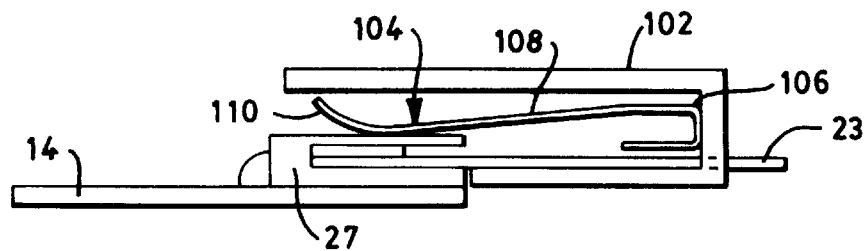
FIG. 11 shows a side view of the electrostatic discharge protection device of FIG. 9 in inoperative position.

The legs 110 have an inherent resilient bias into the operative position such that the tips 110 extend upward relative to the base 106 thereby allowing the mating connector 27 to move between the legs 108 and the conductive pads 25 as is shown in FIG. 11.

Figure 12A:
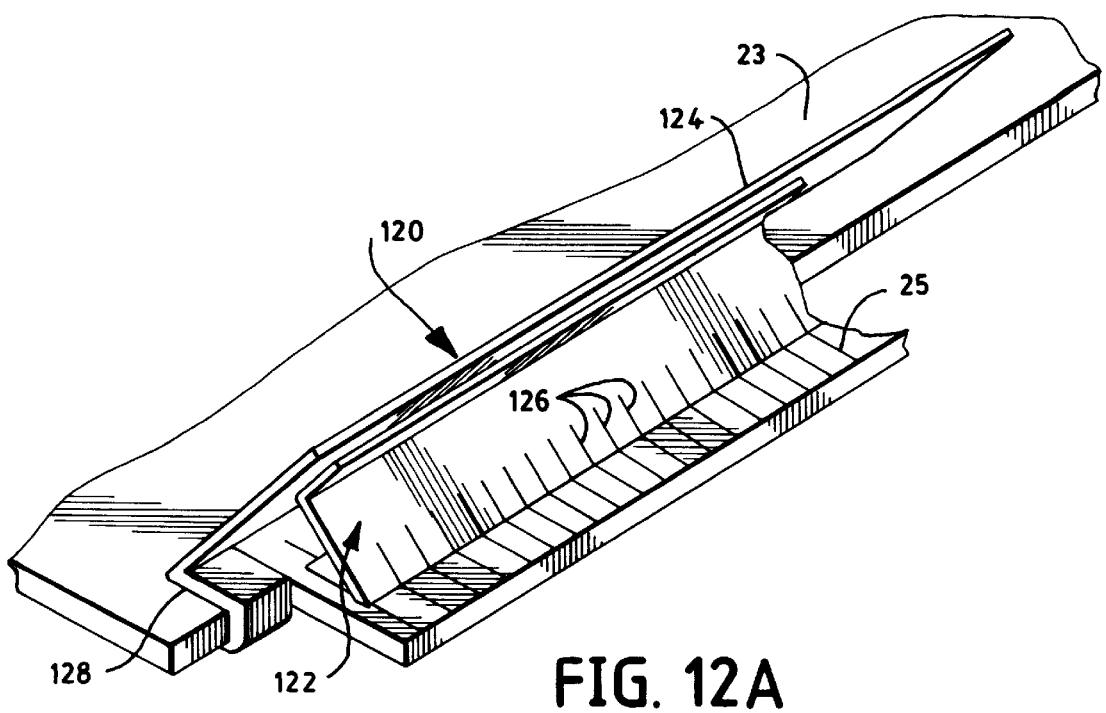
FIGS. 12A and 12B show alternative embodiments of the electrostatic discharge protection device of FIG. 9.
Figure 12B:
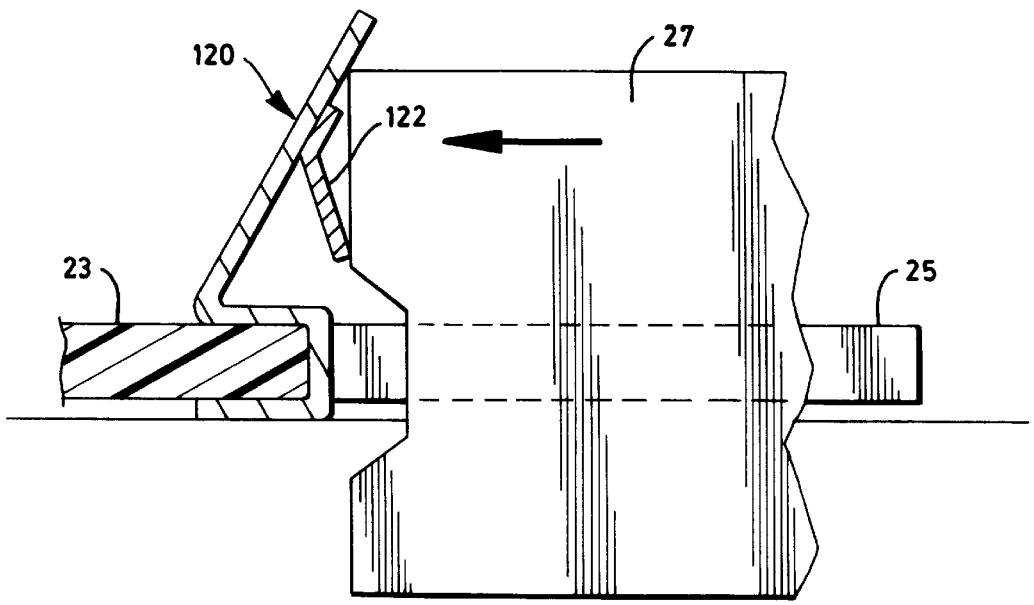

FIGS. 12A and 12B show an alternative embodiment of the electrostatic discharge protection device 120 for use on the conductor 23 having the conductive pads 25. In this embodiment, the electrostatic discharge protection device 120 does not have a housing. Instead, the electrostatic discharge protection device is secured to the conductor 23 with a flange 124. The flange 124 extends outward substantially parallel and at an angle to the conductive pads 25. Flange 124 has a substantially 'U'-shaped extension 128 extending around the conductor 23 so as to hold the flange 124 securely in place relative to the conductor 23.

The flange 124 is fabricated of any of various materials regardless of their conductivity. The flange 124 has an inward bias towards the conductive pads 25. Disposed on a front surface of the flange 124 is a base 122 with legs 126 extending therefrom. The legs 126 have a spaced-apart relationship in correspondence with that of the conductive pads 25 which are resiliently biased against those conductive pads. In this way the electrostatic discharge protection device 120 has a normal position into electrical contact with the conductive pads 125, thereby establishing an operative position which inhibit electrostatic charge accumulation thereon.

When the conductive pads 25 are inserted into the mating connector 27, the mating connector 27 mechanically contacts the base 122 and the flange 124 causing the legs 122 to move away from the conductive pads 25. This establishes electrical isolation between the conductive pads 25 and moves the electrostatic discharge protection device 120 into the inoperative position.

Figure 13A:
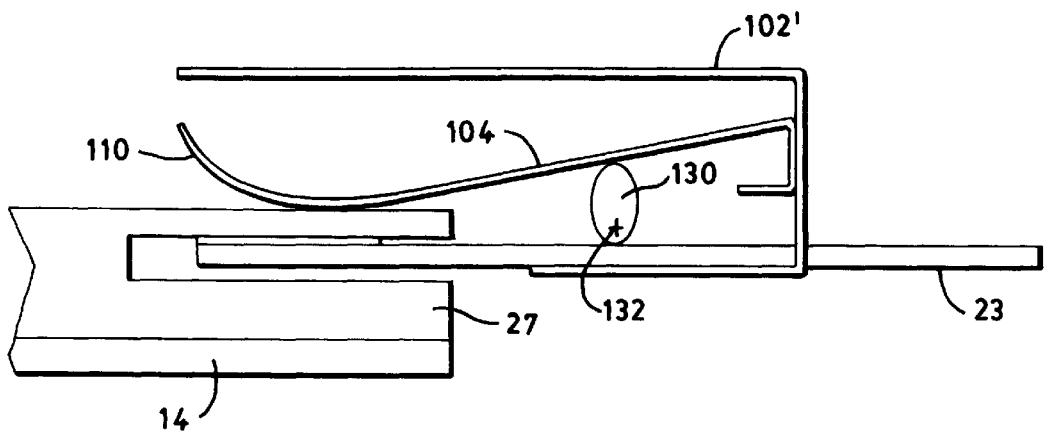
FIGS. 13A and 13B show alternative actuation devices for use with the electrostatic discharge protection device of FIG. 9.
Figure 13B:
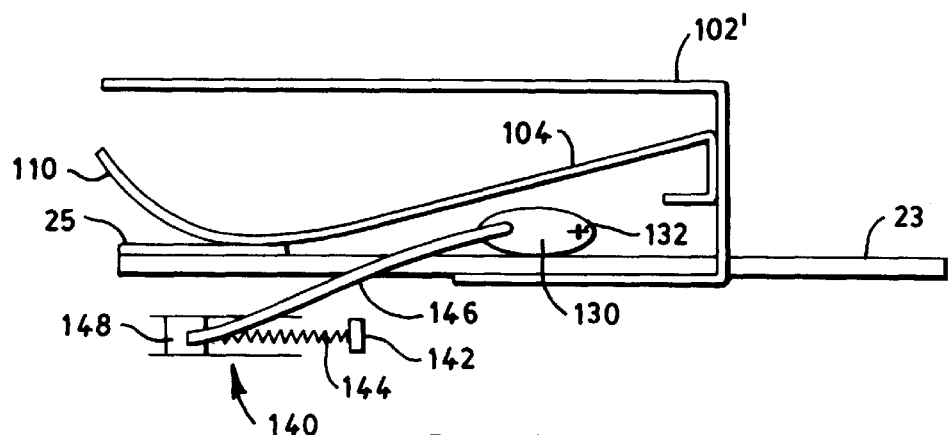

FIGS. 13A and 13B show an alternative embodiment of the invention which, like previously described embodiments, uses a cam 130 which pivots about a pivot point 132 to move the conductive element 104, previously described in FIGS. 9A–11 into the inoperative position. This provides either manual actuation or an alternative method of automatic actuation.

For manual operation, the cam 130 is connected to a handle (not shown) on an external portion of the housing 102' and, thus provides an actuation device for moving the electrostatic discharge protection device into and out of operative and inoperative positions regardless of whether the conductor 23 is inserted into the mating connector 27. Simultaneously therewith, the automatic movement actuation into the inoperative position is still maintained in the way previously described.

Figure 14:
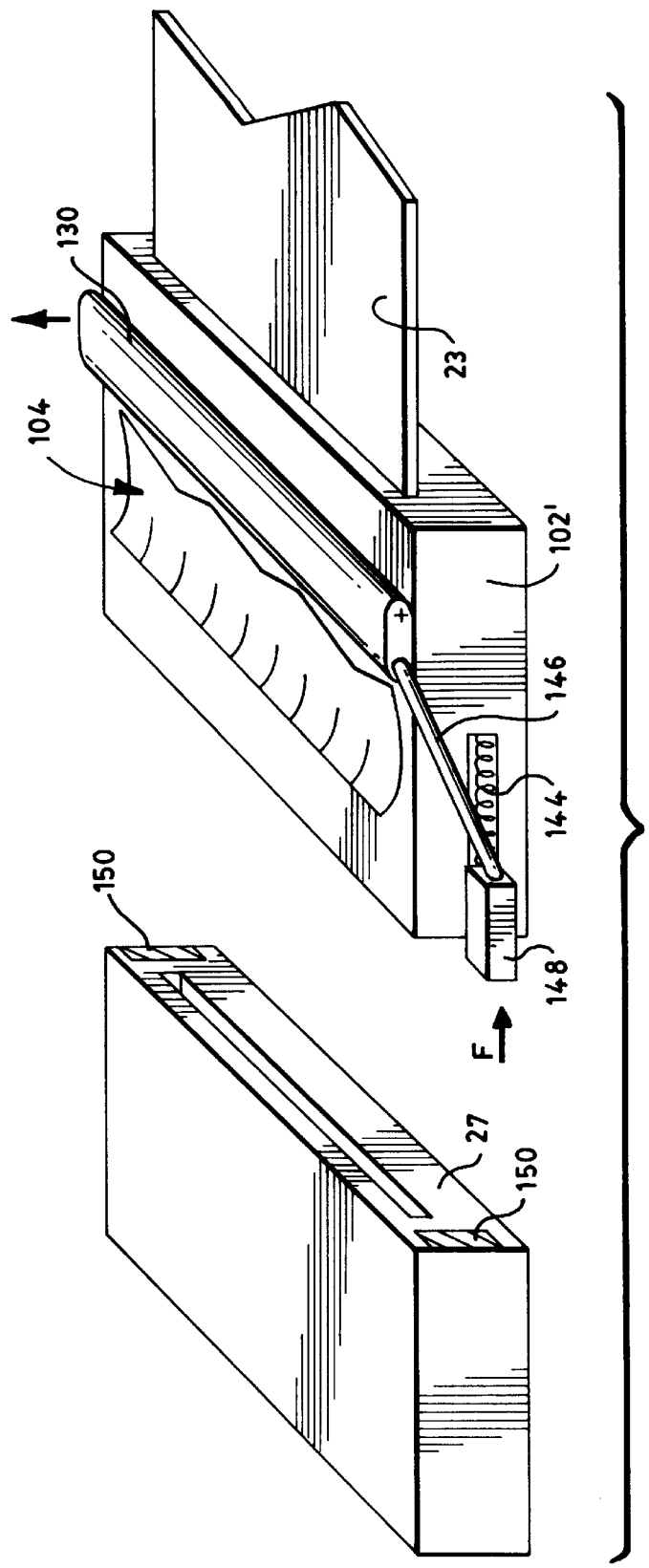
FIG. 14 shows a method of triggering the actuation device of FIGS. 13A and 13B.

FIG. 13B shows an actuation device for automatically moving the cam such that the conductive element 104 is moved into the inoperative position automatically. The actuation device will be described with reference to FIG. 14 embodiment. The cam 130 is mechanically connected to an actuation device 140 having a plunger 148 disposed at an end of a rod 146. When the plunger 148 contacts the contact surface on 150 of the mating connector 27, the plunger overcomes an outward spring bias by the spring 144 which is pushing against a housing wall 142. Thus, the plunger is moved with the force, F, inward rotating the cam 130 relative to its pivot 132 upward along the line of movement, M, and moving the conductive element 104 away from the pads 25.

Figure 15A:
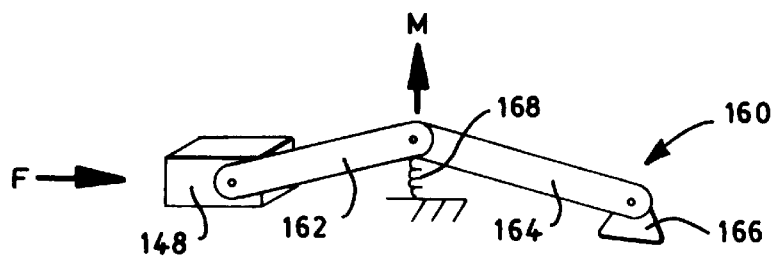
FIGS. 15A–15D show alternative methods of triggering the actuation device of FIGS. 13A and 13B.

FIGS. 15A through 15D show alternative actuation devices for use with the previous embodiment. More particularly, FIG. 15A shows the plunger 148 where the force, F, is shown against the plunger. The plunger in this embodiment moves inward to the first connector arm 162 connected at a pivot point to a second connector arm 164. The second connector arm 164 is pivotably secured relative to a pivot 166 attached to a housing. A spring 168 is, in turn, attached to the first pivot arm 162 to bias the plunger 148 outward. The force, F, overcomes the bias of the spring 168 and moves the first and second pivot arms 162, 164 upward in the direction of movement, M. This device could be attached to the cam of the previous embodiments to move the cam upward as previously described.

Figure 15B:
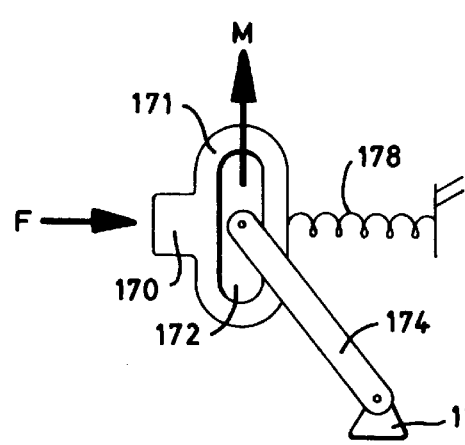

FIG. 15B shows an embodiment where the plunger 170 is made to be integral with an oblong housing 171 having an opening 172 disposed therein. A pivot arm 174 is then connected through the opening 172 and to a stationary pivot point 176. A spring 178 biases the pivot arm into a downward position. As the force, F, contacts the plunger 170 the oblong housing moves inward overcoming the bias of the spring 178. The pivot arm 174 then moves upward through the opening 172 in the direction of movement, M, moving the cam as previously described.

Figure 15C:
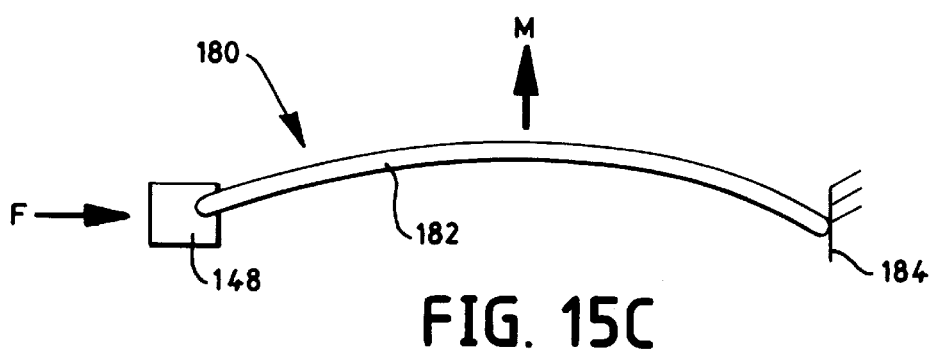

FIG. 15C shows a plunger 148 having a flexible shaft 182 connected to a stationary housing wall 184. In this embodiment, the actuation device 180 has a plunger 148 that reacts to the force, F, by forcing a flexible shaft 182 upwards in the direction of movement M. The cam could then be connected to a mid-portion of the flexible shaft 182 to provide movement of the electrostatic discharge protection device into the inoperative position or the flexible shaft could be positioned directly under the conductive element for direct actuation.

Figure 15D:
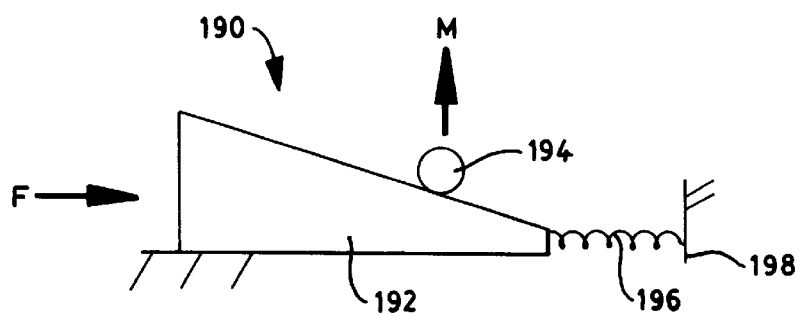

FIG. 15D shows an alternative actuation device 190 where a wedge 192 rests against a shaft 194. The wedge is spring biased away from the housing wall 198 with a spring 196. As the force, F, moves the wedge 192 inward, the shaft 194 moves upwards in the direction of movement M. The cam could then be connected to the shaft 194 of the electrostatic discharge protection device into the inoperative position or connected directly as previously described.

The invention may be embodied in other specific forms without departing from the spirit or essential characteristics thereof the present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

The embodiments of the invention in which an exclusive property or privilege is claimed are defined as follows:

1. An electrostatic discharge protection device for selectively inhibiting electrostatic charge accumulation on an electronic device having a conductor comprising a plurality of wires attached thereto wherein each of the wires is terminated with a respective one of a plurality of spaced pads, each pad having a surface, the electrostatic discharge protection device comprising:

a connector adapted to mate with the electrostatic discharge protection device; and grounding means for providing an electrical connection between the plurality of spaced pads in an operative position and for providing electrical isolation between the plurality of spaced pads in an inoperative position, the grounding means being reversibly actuable from the operative position to the inoperative position by connecting the conductor to the connector such that the connector is mechanically interposed between the grounding means and the spaced pads.

2. The electrostatic discharge protection device according to claim 1 wherein the grounding means comprises:

a base fabricated to be electrically conductive; and a plurality of legs integral and electrically communicative with the base and extending therefrom, having an inherent resilient bias into the operative position which is attained when the inherent resilient bias of the plurality of legs locks each of the plurality of legs against a surface of a respective one or more of the plurality of spaced pads so as to establish electrical communication among the plurality of spaced pads thus inhibiting electrostatic charge accumulation on the plurality of spaced pads, and attaining the inoperative position when the inherent resilient bias of the plurality of legs is overcome by the connector which disrupts the electrical communication with the plurality of spaced pads thus electrically isolating the plurality of spaced pads.

3. The electrostatic discharge protection device according to claim 2 further comprising a housing having a supporting relationship to the grounding means.

4. The electrostatic discharge protection device according to claim 3 wherein the base has an extension extending therefrom adapted to secure the base to the housing.

5. The electrostatic discharge protection device according to claim 3 wherein the housing is sized to allow the surface of the plurality of spaced pads to extend outwardly beyond the housing such that at least one of the plurality of spaced pads can receive a test probe.

6. The electrostatic discharge protection device according to claim 1 wherein the connector further comprises an elongated slider having an insulative surface, where in the inoperative position the insulative surface is opposed to the surface of the plurality of spaced pads.

7. The electrostatic discharge protection device according to claim 6 wherein the elongated slider is adapted to interface with a test device.

8. The electrostatic discharge protection device according to claim 7 wherein the elongated slider further comprises:
   a testing interface which terminates the elongated slider at a distal end and is adapted to mate with the test device; and
   a plurality of contacts disposed on the insulative surface and having a spaced-apart relationship corresponding to the plurality of spaced pads, the plurality of contacts being disposed at a proximal end of the elongated slider in electrical communication with the testing interface such that in the inoperative position of the grounding means each of the plurality of spaced pads electrically communicates with a respective one or more of the plurality of contacts, thereby establishing electrically communication between the plurality of spaced pads and the testing interface.

9. The electrostatic discharge protection device according to claim 7 wherein the elongated slider further comprises:
   a bottom surface having the electrical connector;
   a plurality contacts, spaced apart and being electrically conductive, each of the plurality of spaced pads contacting a respective one or more of the plurality of contacts in the inoperative position; and
   a second plurality of spaced pads in electrical communication with the plurality of contacts and being adapted to engage the test device.

10. The electrostatic discharge protection device according to claim 1 wherein each of the wires further comprises a central conductor enclosed within an insulating layer and wherein at least a portion of the insulating layer of the central conductor is exposed, the grounding means being removably actuable into contact with the exposed portion to establish the operative position.

11. The electrostatic discharge protection device according to claim 10 wherein the grounding means is slidable relative to the exposed portion.

12. The electrostatic discharge protection device according to claim 10 wherein the exposed portion is housed within a conductive sheath such that a diameter of the central conductor is effectively increased.

13. The electrostatic discharge protection device according to claim 12 wherein the grounding means comprises:
   elastive means for mechanically connecting the conductive sheath of each of the leads such that the leads are biased into electrical isolation to form the inoperative position; and
   a slide slidably disposed with respect to the conductive sheath of the leads such the conductive sheath of each of the leads selectively communicate to form the operative position.

14. The electrostatic discharge protection device according to claim 12 wherein the grounding means comprises:
   elastive means for biasing the conductive sheath of the leads into electrical communication to form the operative position; and
   a comb having insulative extensions protruding therefrom, the comb being movable to interpose the conductive sheaths with the insulative extensions, thus forming the inoperative position.

15. The electrostatic discharge protection device according to claim 1 wherein the connector further comprises a connector nose fabricated of insulative material that interposes the grounding means and the plurality of spaced pads in the inoperative position.

16. The electrostatic discharge protection device according to claim 15 wherein the connector nose is affixed to a printed circuit board.

17. The electrostatic discharge protection device according to claim 1, wherein the electronic device comprises a magnetoresistive head.

18. The electrostatic discharge protection device according to claim 1, wherein the electronic device comprises a semiconductor device.

19. An electrostatic discharge protection system for use with an electronic device having wires connected thereto, where the electronic device has a test mode for connecting the wires to a test device and a connected mode for connecting the wires to a circuit board, the electrostatic discharge protection system comprising:
   first shorting means for selectively inhibiting charge accumulation when the electronic device is in the test mode, the first shorting means being movable between an operative position and an inoperative position, the operative position providing shorting of charge accumulation, the inoperative position providing electrical communication to the test device;
   first actuation means for selectively moving the first shorting means between the operative position and the inoperative position;
   second shorting means for selectively inhibiting charge accumulation when the electronic device is in the connected mode, the second shorting means being movable between an operative position and an inoperative position, the operative position providing shorting of charge accumulation, the inoperative position providing electrical communication to the circuit board; and
   second actuation means for selectively moving the second shorting means between the operative position and the inoperative position.

20. The electrostatic discharge protection system according to claim 19 wherein the first actuation means is a paddle board.

21. The electrostatic discharge protection system according to claim 19 wherein the first actuation means is a cam manually actuating the first shorting means.

22. The electrostatic discharge protection system according to claim 19 wherein the second actuation means is a connector on a circuit board.

23. The electrostatic discharge protection system according to claim 19 wherein the second actuation means is a cam for manually actuating the second shorting device.

24. The electrostatic discharge protection system according to claim 19, wherein the electronic device comprises a magnetoresistive head.

25. A method of protecting an electronic device from electrostatic discharge damage comprising:
   placing a shunt across a connector having a plurality of conductive pads disposed thereon such that each of the plurality of pads is electrically connected; and
   establishing electrical isolation of the plurality of pads prior to use of the electronic device by reversibly interposing a slider between the shunt and the plurality of pads.

26. The method according to claim 25, wherein the electronic device comprises a magnetoresistive head.

27. The method according to claim 25, wherein the electronic device comprises a semiconductor device.

28. A method of protecting an electronic device from electrostatic discharge damage, the electronic device having wires connected thereto, where the electronic device has a test mode for connecting the wires to a test device and a connected mode for connecting the wires to a circuit board, the method comprising:

placing first shorting means across the wires for selectively inhibiting charge accumulation when the electronic device is in the test mode, the first shorting means being reversibly movable between an operative position and an inoperative position, the operative position providing shorting of charge accumulation, the inoperative position providing electrical communication to the test device; and placing second shorting means for selectively inhibiting charge accumulation when the electronic device is in the connected mode, the second shorting means being reversibly movable between an operative position and an inoperative position, the operative position providing shorting of charge accumulation, the inoperative position providing electrical communication to the circuit board.

29. The method according to claim 28, wherein the electronic device comprises a magnetoresistive head.

30. An electrostatic discharge protection system for selectively inhibiting electrostatic discharge on an electronic device having wires selectively connected thereto, wherein each of the wires is electrically terminated with a respective one of a plurality of spaced pads, each pad having a surface, the electrostatic discharge protection system comprising:

a base fabricated from a conductive material;

a housing having a supporting relationship to the base;

at least one leg having a inherent resilient bias, the at least one leg integral with the base and extending therefrom and forming in conjunction with the base a grounding means, the grounding means having an operative position and an inoperative position, the operative position being attained when the inherent resilient bias of the at least one leg locks the at least one leg against the surface of one or more of the plurality of spaced pads, the one or more of the plurality of spaced pads in electrical communication with the base thus inhibiting electrostatic charge accumulation on the plurality of spaced pads, the inoperative position being attained when the plurality of spaced pads become electrically isolated from the base, disrupting the electrical communication with the plurality of spaced pads; and actuation means disposed on the housing for selectively reversibly moving the grounding means between the inoperative position and the operative position thus selectively inhibiting electrostatic charge accumulation.

31. The electrostatic discharge protection system according to claim 30 wherein the actuation means is a cam.

32. The electrostatic discharge protection system according to claim 31 wherein the cam is manually actuable to shift the grounding means between operative and inoperative positions.

33. The electrostatic discharge protection system according to claim 31 wherein the cam is automatically actuable through mechanical contact with the connector to shift the grounding means between operative and inoperative positions.

34. The electrostatic discharge protection system according to claim 30 wherein the actuation means comprises:

a plunger disposed on the housing and in mechanical communication with the grounding means such that displacement of the housing is translated into displacement of the grounding means; and elastic means for biasing the plunger to move the grounding means into the operative position where force applied to overcome the bias is translated to movement of the grounding means into the inoperative position.

35. The electrostatic discharge protection system according to claim 30 wherein the actuation means comprises:

a wedge disposed on the housing and in mechanical communication with the grounding means such that displacement of the housing is translated into displacement of the grounding means; and elastic means for biasing the wedge to move the grounding means into the operative position where force applied to overcome the bias is translated to movement of the grounding means into the inoperative position.

36. The electrostatic discharge protection system according to claim 30 wherein the actuation means is an elongated slider that is replacably and removably insertable between the grounding means and the spaced pads to shift the grounding means between operative and inoperative positions.

37. The electrostatic discharge protection system according to claim 30, wherein the electronic device comprises a magnetoresistive head.

38. The electrostatic discharge protection system according to claim 30, wherein the electronic device comprises a semiconductor device.

* * * * *